June 6, 1961

F. B. STONE 2,987,081

MACHINE

Filed Aug. 20, 1956

INVENTOR.
FLOYD B. STONE
BY
Lyon & Lyon
ATTORNEYS.

June 6, 1961 F. B. STONE 2,987,081
MACHINE
Filed Aug. 20, 1956 8 Sheets-Sheet 6

INVENTOR.
FLOYD B. STONE
BY
Lyon & Lyon
ATTORNEYS.

United States Patent Office 2,987,081
Patented June 6, 1961

2,987,081
MACHINE
Floyd B. Stone, San Francisco, Calif., assignor to K-Lath Corporation, Monterey Park, Calif., a corporation of California
Filed Aug. 20, 1956, Ser. No. 605,136
23 Claims. (Cl. 140—10)

This invention relates to an improved machine for making lathing.

It is an object of this invention to provide a machine for automatically forming lathing of the type described in the following United States Letters Patents No. 2,166,443, issued July 18, 1939, to C. A. Karelius, for "Lathing," No. 2,236,141, issued March 25, 1941, to C. A. Karelius, for "Lathing," No. 2,375,302, issued May 8, 1945, to A. C. Karelius, for "Lathing," No. 2,375,303, issued May 8, 1945, to C. A. Karelius, for "Lathing" and No. 2,408,781, issued October 8, 1946, to A. C. Karelius, for "Lathing."

It is an object of this invention to provide a machine which will feed a plurality of wires in parallel relationship along a path to suitably position a sheet of paper thereupon having openings therethrough and positioning a plurality of wires across said openings and welding same to the first mentioned wires thereby forming said lathing.

It is still a further object of this invention to provide novel wire feed means for such a machine.

It is still a further object of this invention to provide means for automatically feeding the components into the machine and cutting off the finished product.

Other objects and advantages will be readily apparent from the following description.

Figure 1:
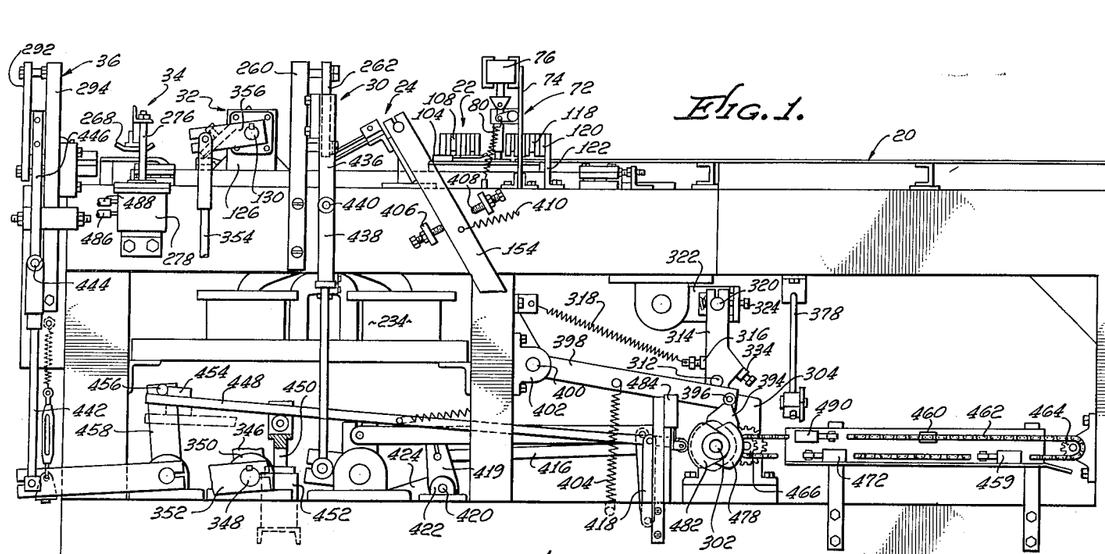
FIGURE 1 is a side elevation of the machine with portions broken away.
Figures 2, 3:
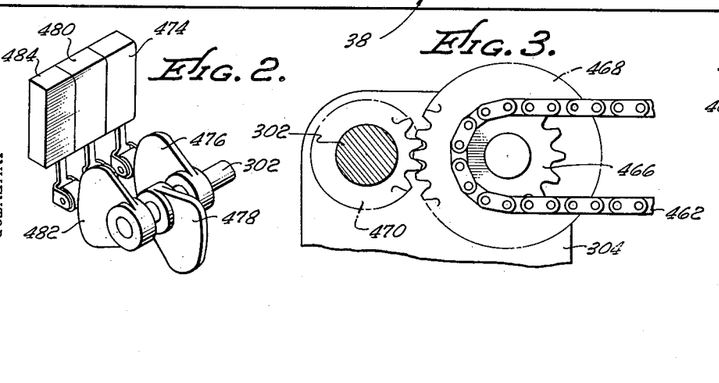
FIGURE 2 is a fragmentary perspective view of the synchronizing mechanism.
FIGURE 3 is a fragmentary side elevation of the timing chain driving means.
Figures 9, 10, 11, 12, 13, 14, 15:
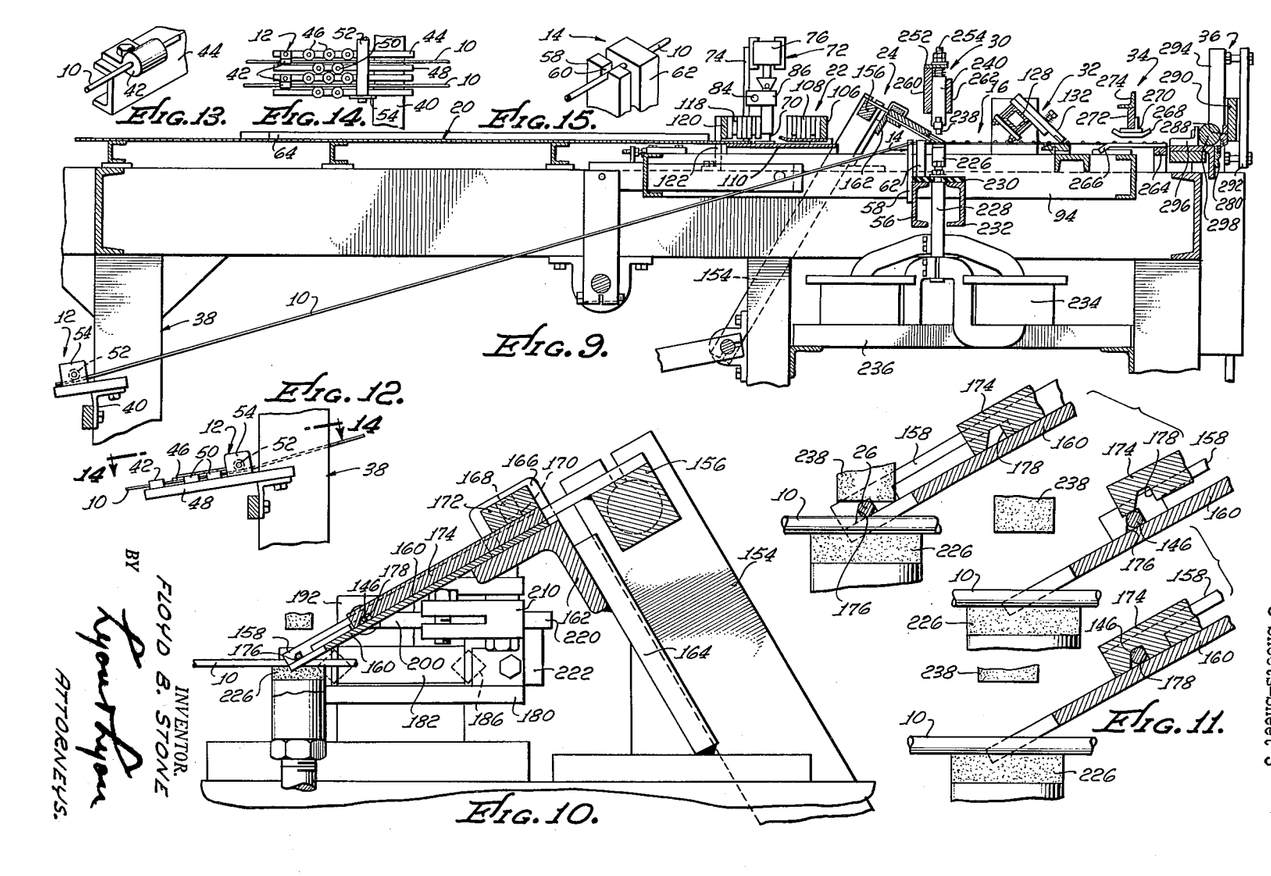
FIGURE 9 is a fragmentary side elevation in section as viewed from the side of the machine illustrated in FIGURE 5.
FIGURE 10 is a fragmentary side elevation partially in section illustrating the cross wire feeding and holding mechanism.
FIGURE 11 is a sequential diagrammatic view of the operation of the cross wire feeding and holding mechanism.
FIGURE 12 is a fragmentary side elevation of the longitudinal wire guiding means.
FIGURE 13 is a fragmentary perspective view of a portion of the longitudinal wire guiding means.
FIGURE 14 is a fragmentary plan view of the longitudinal wire guiding means taken along line 14—14 of FIGURE 12.
FIGURE 15 is a fragmentary perspective view of the additional longitudinal wire guiding means.
Figure 16:
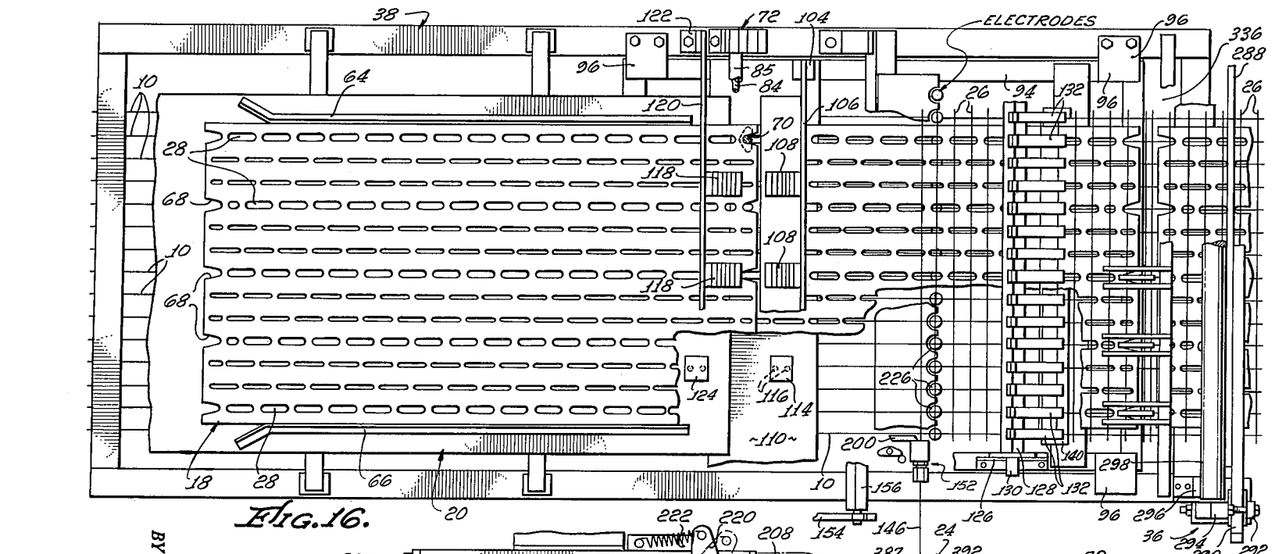
FIGURE 16 is a top plan view with certain parts broken away.

Referring first to FIGURES 1, 9 and 16, the longitudinal wires 10 are reeved from suitable spools through guide means 12 through additional guide means 14, over the forming bed 16. A plurality of longitudinal wires are utilized, fifteen being illustrated in FIGURE 16; however, the number may vary widely and the guide means and additional guide means accommodates each wire.

Suitably apertured sheets of paper 18 are supported upon bed 20, and paper advancing mechanism 22 is provided to feed the paper onto forming bed 16. A cross wire feeding mechanism 24 periodically feeds a cross wire 26 across the paper 18 and the longitudinal wires 10 and hold same in contact with the longitudinal wires 10 through apertures 28 in paper 18.

A welding unit 30 is then lowered to weld the cross wire 26 to the longitudinal wires 10 and the wire feeding mechanism 32 is actuated to advance the longitudinal wires 10 to move forward along the forming bed 16 a suitable distance before the next cross wire 26 is fed across bed 16 and welded into position.

A crimping mechanism 34 is provided over bed 16 to crimp certain selected intersections of longitudinal wires 10 and cross wires 26 out of the plane of the lathing being formed.

At the front end of the machine a cutting mechanism 36 is provided which is actuated periodically to cut off a sheet of lathing of desired length.

Mechanisms are provided to actuate each of the various devices above referred to in the proper sequence which will hereinafter be described in detail.

The components of the machine are suitably mounted upon a frame 38 such as, for example, the guide means 12 which are supported upon a suitable bracket 40 fixed between the spaced rear legs of the frame. The guide means comprises a sleeve 42 for each longitudinal wire 10 (see FIGURES 13 and 14) mounted upon a channel 44, projecting rearwardly from the bracket 40. Each channel 44 has positioned on the upper surface thereof spaced rollers 46 rotatably mounted thereon. Between each channel 44 an auxiliary channel 48 is provided which does not carry a sleeve 42, through which the wire is drawn, but does carry rotatably mounted rollers 50 thereon. Thus, as the wires 10 are drawn into the machine, each passes through a sleeve 42 and between a set of rollers 46 and 50, eliminating any possibility of there being a kink in the wires. A hold-down roller 52 is rotatably mounted over the wires 10 by means of brackets such as 54, mounted upon the outside channels and functioning to prevent the wires 10 from pulling out from between rollers 46 and 50.

The wires 10 are supplied from suitable spools (not shown) which may rest on the floor with the wires passing through guide means 12, and upwardly to forming bed 16. Positioned at the uppermost extremity of the inclined approach of the wires 10 is an additional wire guide 14, one for each wire, mounted upon a suitable cross brace 56. As best seen in FIGURE 15, the additional guide means has a bar 58 having a wire receiving groove 60 in the upper surface thereof. An additional bar 62 has a bore therethrough through which the wire 10 passes. Thus the additional wire guide 14 changes the direction of wire 10 to horizontal across bed 16 and prevents any kinks forming therein. In this manner the longitudinal wires are fed to the forming bed 16.

As the longitudinal wires progress over the bed 16 under influence of the wire feeding mechanism 32 hereinafter to be described in detail, a paper sheet or backing 18 is superimposed thereon. The sheet or backing 18 has rows of apertures 28 formed therein which rows are spaced from one another the distance between longitudinal wires 10 best seen in Figure 16.

Figures 17, 18:
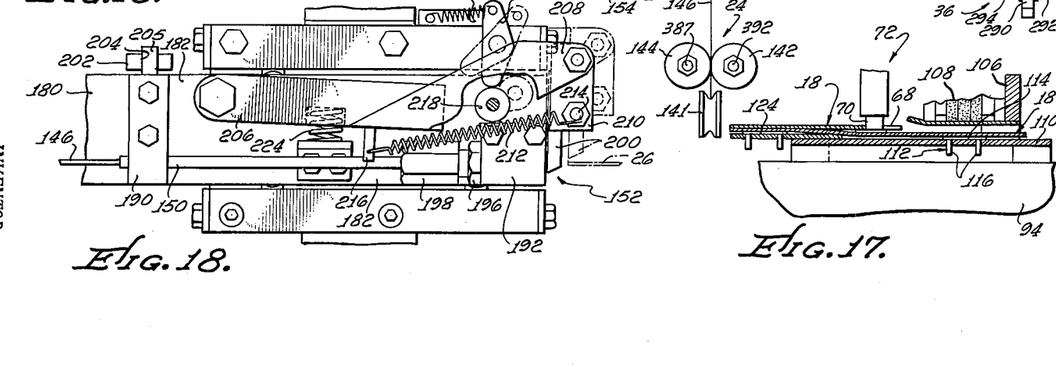
FIGURE 17 is a fragmentary side elevation partially in section illustrating the paper restraining mechanism.
FIGURE 18 is a fragmentary top plan view of the cross wire feeding mechanism at the cutting position.

A sheet of paper is placed upon paper support bed 20 between the guide rails 64 and 66 and manually advanced toward bed 16. The ends of each sheet 18 have notches 68 cut therein which receive shaft 70 of the paper restraining means 72, see FIGURES 17, 32 and 33. The restraining means 72 is mounted upon bracket 74 which in turn is suitably mounted upon the frame 38 of the machine. The bracket 74 at its uppermost extremity supports solenoid 76 having an arm 78 depending therefrom which arm is biased downwardly by spring 80 fixed at one end to arm 78 and at the other to the machine frame 38. A crank 82 is pivotally mounted to arm 78 and rigidly fixed to shaft 84. The shaft 84 is journalled in a sleeve 85 which in turn is fixed upon bracket 74. Shaft 84 has at its opposite extremity a housing 86 through which an extremity of shaft 70 projects. The shaft has a notch 88 into which strip 90 projects which strip is bolted to housing 86 thereby retaining the shaft 70 from withdrawing from the housing and preventing shaft 70 from turning. The shaft 70 moves in a sleeve welded to the underside of the housing 86. Shaft 70 enters notches 68 and the shaft has a shoe 92 which is larger than notches 68 on its extremity and beneath sheet or backing 18. Thus when sheet or backing 18 is placed upon bed 20 its forward progress is limited by engagement of one or more notches 68 with one or more shafts 70. Notch 88 is greater in depth than the strip 90 which engages it, thus allowing shoe 92 to float by its own weight upon the paper under it, thus causing no drag upon the moving paper sheet under shoe 92.

At an appropriate time in the operation of the machine as will hereinafter be described, the solenoid 76 is energized raising arm 78 and pivoting shaft or shafts 70 to the dotted line position in FIGURE 33 permitting the sheet or backing 18 to advance into the machine. Upon deenergization of the solenoid the spring 80 moves the solenoid arm 78 downwardly and returns shaft 70 to the appropriate position to arrest movement of the next sheet or backing 18.

A carriage 94 has a rectangular frame lying in a horizontal plane and is reciprocated beneath forming bed 16 and paper supporting bed 20. At each corner the carriage 94 (see FIGURE 28), has a plate 96 fixed thereon to which the upper half 98 of a bearing is secured while the lower half 100 of the bearing is mounted upon a suitable brace 102 of the machine frame 38. The carriage thus supported is reciprocated longitudinally beneath beds 16 and 20 by mechanism hereinafter to be described in detail. The frame of the carriage 94 extends beyond the sides of beds 16 and 20 as best seen in FIGURE 16. A bracket 104 is supported on carriage 94 on either side of the beds projecting above the level thereof. A cross brace 106 is supported between bracket 104 above the level of the beds 16 and 20 and has a plurality of electric magnets 108 spaced thereon overlying the space between beds 16 and 20. Supported by the frame of carriage 94 beneath the magnets 108 is a plate 110 which functions to support the leading edge of a sheet of paper or backing 18 after same has passed beyond the paper restraining means 72.

A plurality of clamps 112 are supported in plate 110. These clamps are a flat sheet 114 lying on the upper surface of plate 110 and having pins 116 which project through suitable holes in plate 110. When through suitable timing mechanism the magnets 108 are energized the clamps 112 are attracted thereto thereby clamping paper or backing 18 therebetween so that as carriage 94 is moved to the left in FIGURE 1 or to the right in FIGURE 9 the paper or backing is advanced towards forming bed 16. The length of travel of carriage 94 is the distance between adjacent cross wires 26. Upon the return stroke of the carriage, means are provided to grip the paper or backing 18 and hold same in the advanced position. At the beginning of the return stroke of the carriage 94, power to magnets 108 is terminated so that clamps 112 fall within their pins 116 projecting through holes in plate 110. At the same time magnets 118 are energized. These magnets are supported over the bed 20 upon a cross brace 120 in turn supported by brackets 122 fixed upon the stationary frame of the machine. Beneath the magnets 118 in stationary paper supporting bed 20 are provided clamps 124 similar to clamps 112. Thus, when the magnets 108 are shut off and magnets 118 energized, the clamps 124 raise and hold the papers 18 stationary upon the return stroke of carriage 94. At an appropriate time the magnets 118 are shut off and magnets 108 energized as the carriage starts its next forward stroke.

Also mounted upon carriage 94 is the longitudinal wire feeding mechanism 32.

Figures 5, 6, 7, 8:
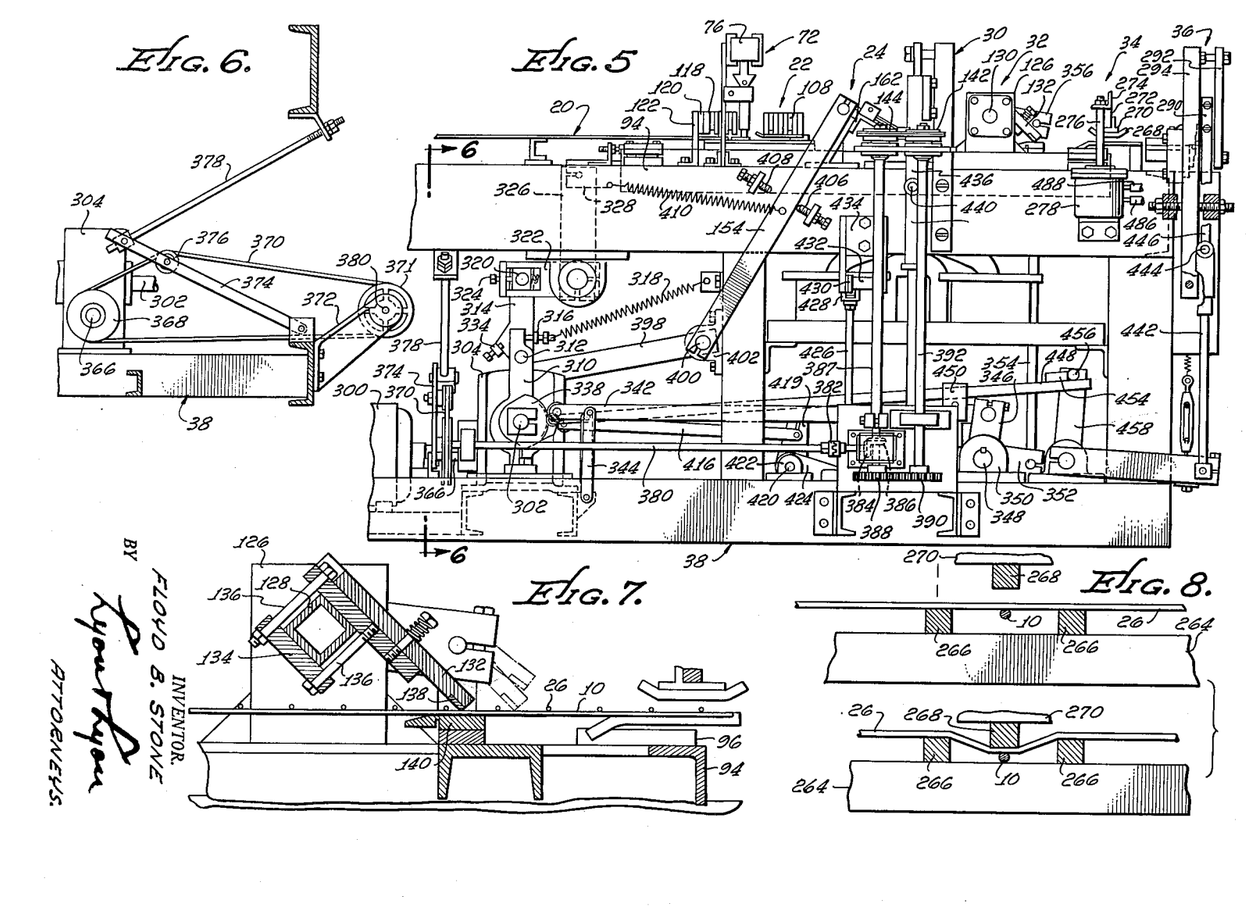
FIGURE 5 is a fragmentary side elevation similar to FIGURE 1 of the opposite side of the machine.
FIGURE 6 is a view taken along the line 6—6 of FIGURE 5 showing driving of the cross wire feed rollers.
FIGURE 7 is a side elevation in section of the longitudinal wire feeding mechanism.
FIGURE 8 is a diagrammatic view illustrating functioning of the wire indenting mechanism.

This mechanism is best illustrated in FIGURES 1, 5, 7 and 16. On either side of forming bed 16 an upright bracket 126 is mounted upon carriage 94. Between these brackets a square shaft 128 is rotatably mounted by having a circular stud 130 on the extremities thereof which project through suitable bearings in brackets 126. Spaced along shaft 128 are a plurality of wire engaging fingers 132, one for each longitudinal wire 10. As best seen in FIGURE 7, each finger 132 is clamped on shaft 128 by a bar 134 being on one side of the shaft and the finger on the other with bolts 136 securing the bar to the finger. In this manner the bolts may be loosened and the position of each finger on shaft 128 adjusted. The wire engaging portion of finger 132 has a hardened steel insert 138 which actually engages the longitudinal wires 10 to reduce wear.

Beneath the point of contact of fingers 132 and wires 10 an anvil 140 is supported between the sides of the frame of carriage 94 so that the wires are clamped between anvil 140 and fingers 132 during forward movement of carriage 94 thereby pulling the longitudinal wires into the machine.

At the forward extremity of movement of carriage 94 the shaft 128 is rotated counterclockwise as seen in FIGURE 7, by means which will hereinafter be described, thereby releasing wires 10 during the rearward stroke of the carriage. At the rearmost extremity of the carriage, square shaft 128 is again rotated so that fingers 132 again move downwardly clamping wires 10 to anvil 140 preparatory to the next forward stroke of the carriage 94.

As previously described, a cross wire 26 is fed through feed means 24 across the upper surface of paper 18 which in turn rests upon the longitudinal wires 10. These cross wires are fed from a spool 141 between two wheels 142 and 144 (see FIGURES 16 and 19), which are power-driven as hereinafter will be described. The wheels 142 and 144 are spaced from one another, however, each frictionally engages wire 146 fed therebetween and when the wheels are rotated they force the wire 146 to the right in FIGURE 19 across bed 16 uncoiling same from the coil. For this purpose the wheels have a grooved central portion 148 (see FIGURE 20), to confine the wire and feed same into sleeve 150 of the cutting mechanism generally designated 152.

After wire 146 emerges from sleeve 150 it is fed across bed 16. For this purpose arms 154 are pivotally mounted with respect to frame 38 on each side of bed 16 of the machine and pivoted in the proper time sequence as will hereinafter be described. Between arms 154 a bar 156 is mounted, the ends of which project through arms 154. Spaced along bar 156 are a plurality of fingers 158 (FIGURES 10, 11, 27 and 35). These fingers slide along a fixed plate 160 which is supported upon angle iron 162 which in turn is mounted upon brackets 164 mounted upon the stationary frame 38 of the machine on either side of bed 16. At either side of plate 160 on angle iron 162 is positioned a bracket 166 (FIGURE 35), carrying a pin 168. Each pin 168 fits into a slot 170 formed in the extremities of free floating bar 172 thereby permitting movement of bar 172 up and down with respect to plate 160. On the underside of bar 172 a plurality of wire guides 174 are fixed. Some of these guides are spaced from one another a distance sufficient to permit one of the fingers 158 to pass therebetween. Each finger 158 and each guide 174 has wire receiving grooves 176 or 178 on the underside thereof. Thus, when arms 154 are fully retracted, the grooves 176 and 178 are aligned as seen in the lower view in FIGURE 11 and the wire 146 as it leaves sleeve 150 passes into the channel thus formed. The wire is fed all the way across bed 16 and is stopped by termination of the rotation of wheels 142 and 144. At this time the cutter 152 severs wire 146 thereby forming a cross wire 26.

As will hereinafter be more fully described, at this time the arms 154 are pivoted towards the front or output extremity of the machine. It will be noted that the groove 178 in guides 174 has its face furthest from bar 156 inclined so that as fingers 158 are moved forwardly along plate 160, the wire cams the guides 174 upwardly as illustrated in the middle view of FIGURE 11. After the wire 26 has been moved beyond guides 174 same move downwardly, resting on plate 160. The fingers 158, at their foremost position, deliver wire 26 to the welding unit 30 where the cross wire 26 is welded to longitudinal wires 10 through apertures 28 in backing 18. After this operation is completed, the arms 154 are pivoted to the rearmost position, retracting fingers 158. The leading edge of groove 176 in fingers 158 is also inclined so that upon the return stroke of the fingers they are cammed upwardly releasing their hold on the cross wire 26. The fingers 158 are made sufficiently flexible to absorb this camming action.

The cutting means 152, which functions to cut a cross wire 26 off the wire 146 after same has been fed across bed 16, is best seen in FIGURES 18, 19, 20 and 21.

Mounted upon frame 38 of the machine is a plate 180 forming a support for slide 182. At the outermost extremity of plate 180 the rectangular frame 184, supporting wheels 142 and 144, is mounted. On either side of slide 182 the plate 180 has an upturned wall confining the slide to reciprocation transversely with respect to bed 16. Roller bearings 186 support the slide in plate 180.

At the outermost extremity of the slide 182, sleeve 150 is supported in a suitable groove formed in the block 188 of the slide and held by clamp 190. At the innermost extremity of the slide a block 192 is bolted. In the block there is mounted a case hardened steel cutting surface insert 194 which is held in position by a nut 196 which screws into block 192 and in turn has screwed into it the extremity of adjusting nut 198 which is fixed upon the extremity of sleeve 150. The wire passes through a central bore in each adjusting nut 198, nut 196 and insert 194 which bore forms a continuation of sleeve 150. The wire projecting from insert 194 is fed transversely across bed 16, as previously described, and upon actuation of the knife 200 severs the wire at the surface of insert 194. To actuate the knife, the slide 182 is reciprocated in the appropriate time sequence by reciprocation of lever 202 which has a groove 204 in its upper extremity receiving pin 205 of slide 182.

The slide 182 has a lever 206 pivotally mounted thereon upon which is fixed a second lever 208 forming a crank arm. Pivotally connected upon the free extremity of lever 208 is a clevis 210 which has rigidly mounted therein the knife 200.

A spring 212, fixed at one extremity by bolt 214 on clevis 210 and at the other extremity on pin 216 which in turn is fixed upon lever 206, urges the knife 200 into yieldable contact with the exterior cutting surface of insert 194.

Figure 19:
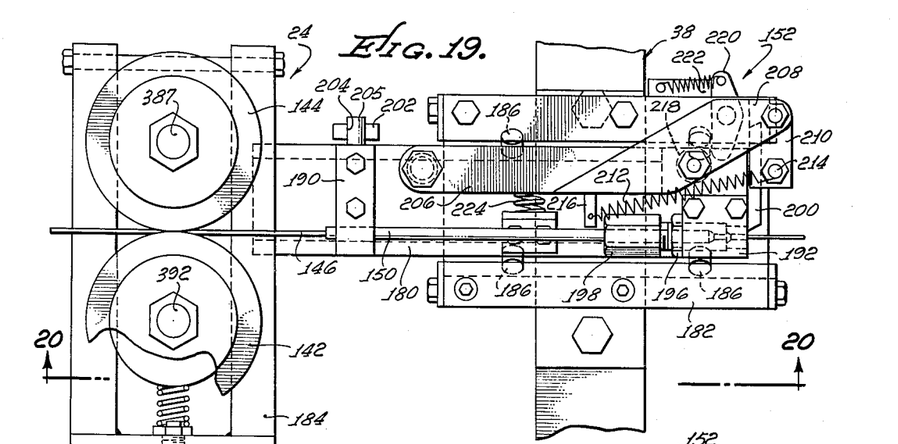
FIGURE 19 is a top plan view of the cross wire feeding mechanism in the feeding position.
Figures 20, 21, 22:
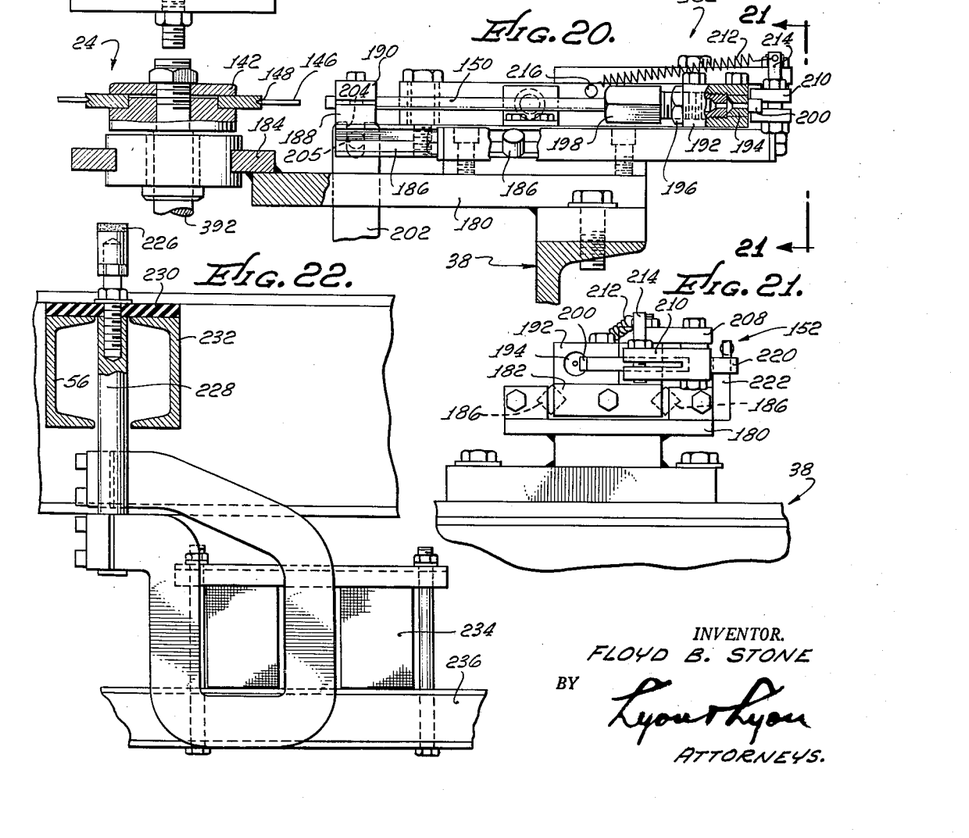
FIGURE 20 is a view taken along line 20—20 of FIGURE 19.
FIGURE 21 is a view taken along line 21—21 of FIGURE 20.
FIGURE 22 is a fragmentary side elevation partially in section illustrating the lower portion of the welding mechanism.
Figure 23:
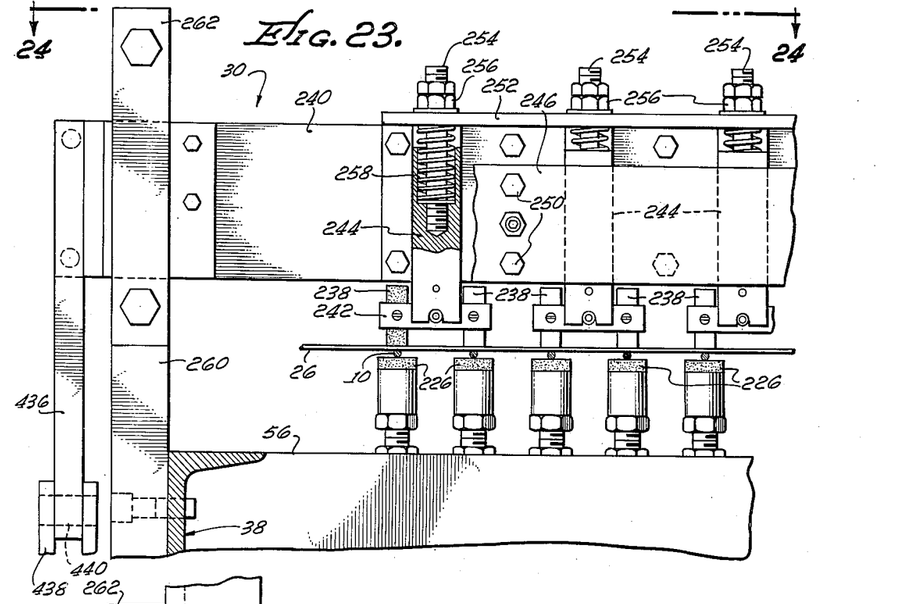
FIGURE 23 is a fragmentary end elevation partially in section illustrating the upper portion of the welding mechanism.
Figures 24, 25, 26:
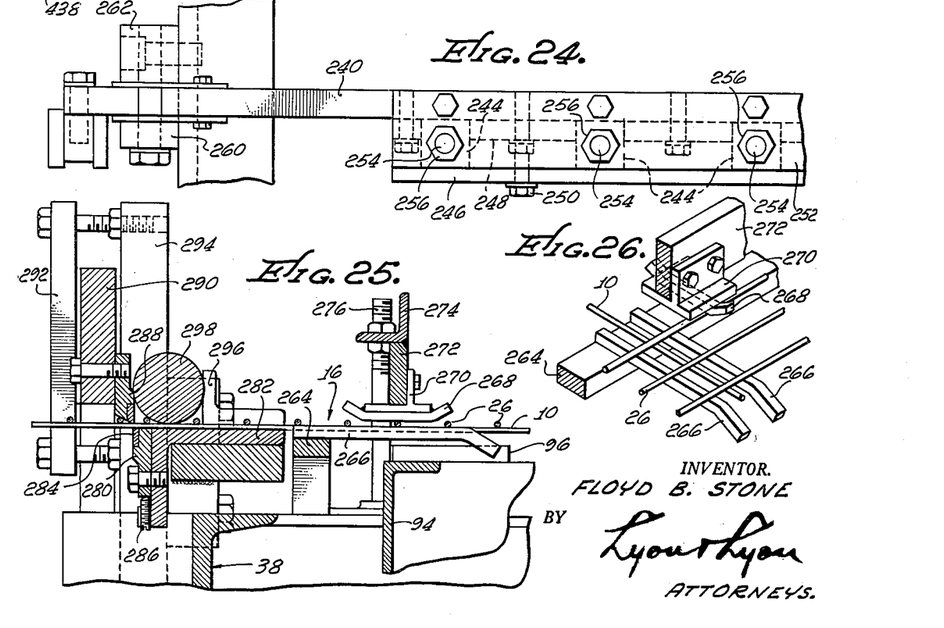
FIGURE 24 is a view taken along line 24—24 of FIGURE 23.
FIGURE 25 is a fragmentary side elevation of the crimping and cutting means.
FIGURE 26 is a fragmentary perspective of the crimping means.

On the under side of lever 208 a roller 218 is pivotally mounted which engages pawl 220 upon forward movement of slide 182. The pawl 220 is pivotally mounted upon the fixed plate 180, however, rotation counterclockwise in FIGURE 19 is precluded by engagement with stop 222 mounted upon fixed plate 180. As the slide moves forward (to the right in FIGURE 19) the roller 218 strikes pawl 220, camming the crank arm clevis 210 and hence knife 200 downwardly across the opening in insert 194 severing the wire projecting therefrom. After the wire is severed the slide moves to the outermost or rear position preparatory to another wire feeding and cutting operation. A spring 224 is mounted upon slide 182 urging lever 206 to a position wherein knife blade 200 is free of insert 194 so that the wire may be fed through sleeve 150 unimpeded.

After a wire 26 has been positioned by fingers 158 on longitudinal wires 10 with the paper backing 18 positioned therebetween, the welding unit 30 operates. In this embodiment, the lower electrodes 226 are fixed, mounted upon supports 228 which project through insulating sheet 230 which in turn is supported upon cross brace 56 and a similar cross brace 232. A suitable coil 234 for each pair of lower electrodes is mounted upon a platform 236 suitably supported in the frame 38 of the machine. The coils are attached to a suitable source of electricity.

The upper electrodes 238, one for each lower electrode, are mounted in interconnected pairs from a cross bar 240. A pair of upper electrodes 238 are physically and electrically connected by bar 242 which is suspended from square bars 244, suitably insulated from the electrodes.

The bars 244 are mounted between cross bar 240 and plate 246, spaced from bar 240 by spacers 248 and held by bolts 250. Also mounted on cross bar 240 is a plate 252 through which bolts 254 pass. The bolts at their lower extremity carry bars 244 and have a nut 256 thereon limiting downward movement. A spring 258 is seated within a recess in bars 244 and bears against the under surface of plate 252 yieldably urging the bar 244 and hence electrodes 238 downwardly.

The cross bar 240 at its extremities projects between upright brace 260 and plate 262 bolted thereon and spaced therefrom forming a slot in which the bar 240 may reciprocate vertically in the proper timed relationship. When a cross wire 26 has been positioned across longitudinal wires 10, the longitudinal wires are supported in contact with the lower electrodes 226. The upper electrodes are lowered engaging cross wire 26 thereby completing the circuit from coil 234 through one lower electrode through the wires 26 and 10 through the upper electrodes 238 and down through the lower electrode 226 and back to the coil thereby welding cross wire 26 to the longitudinal wire 10. A similar circuit is provided for each pair of lower electrodes.

After the cross wire has been welded into place the wire feeding mechanism 32 is caused to operate to move the longitudinal wires 10 a distance equal to the distance between cross wires 26.

It is desirable to position selected longitudinal wires 10 out of the plane of the other longitudinal wires to facilitate nailing the lathing and proper disposition of plaster on both sides thereof and for this purpose the crimping mechanism 34 is provided.

A bar 264 is supported across bed 16 adjacent the front or output end thereof by frame 38.

This bar carries a series of pairs of fingers 266 between which a longitudinal wire 10 passes the fingers forming an anvil.

A bar 268 is mounted upon a bracket 270 in turn mounted upon cross bar 272 which is welded to angle iron 274. The angle iron is in turn mounted upon a piston rod 276 at either extremity on either side of bed 16. The piston rod projects into cylinder 278 and carries a piston. Air is admitted into the cylinder on either side of the piston in the appropriate sequence to raise and lower the piston rods 276 and hence bars 268 to engage the cross wires 26 between fingers 266, as diagrammatically illustrated in FIGURE 8, and push the selected longitudinal wire 10 out of the plane of the other longitudinal wires.

In this embodiment every third longitudinal wire 10 is thus moved, however, it is obvious that a different selection may be made.

After the lathing thus formed is advanced beyond the crimping station it is cut off in sections of a predetermined desired length by the cutting mechanism 36. A cutting bar 280 for the cutting mechanism is mounted upon angle iron 282 in turn mounted upon the foremost extremity of frame 38. The bar has a hardened steel insert 284 and may be positioned by set screw 286.

The cutting knife 288 projects across the end of bed 16 and is bolted upon cross bar 290 and is mounted for vertical reciprocation projecting between plate 292 spaced from and bolted to bar 294 which in turn is supported on either side of bed 16 upon suitable brackets. An angle iron 296 is supported across bed 16 by suitable brackets in turn mounted upon frame 38. The angle iron is above the lathing formed in the machine and spaced from knife 288 to restrain free floating roller 298 which extends across bed 16 and holds the lathing down as a section thereof is cut off by knife 288. The knife 288 is reciprocated in the proper time relationship as hereinafter will be described.

Turning now to the driving mechanisms for actuating the portions of the machine heretofore described, a motor 300 drives a drive shaft 302 through a gear reduction box 304.

Figures 27, 28, 29, 30:
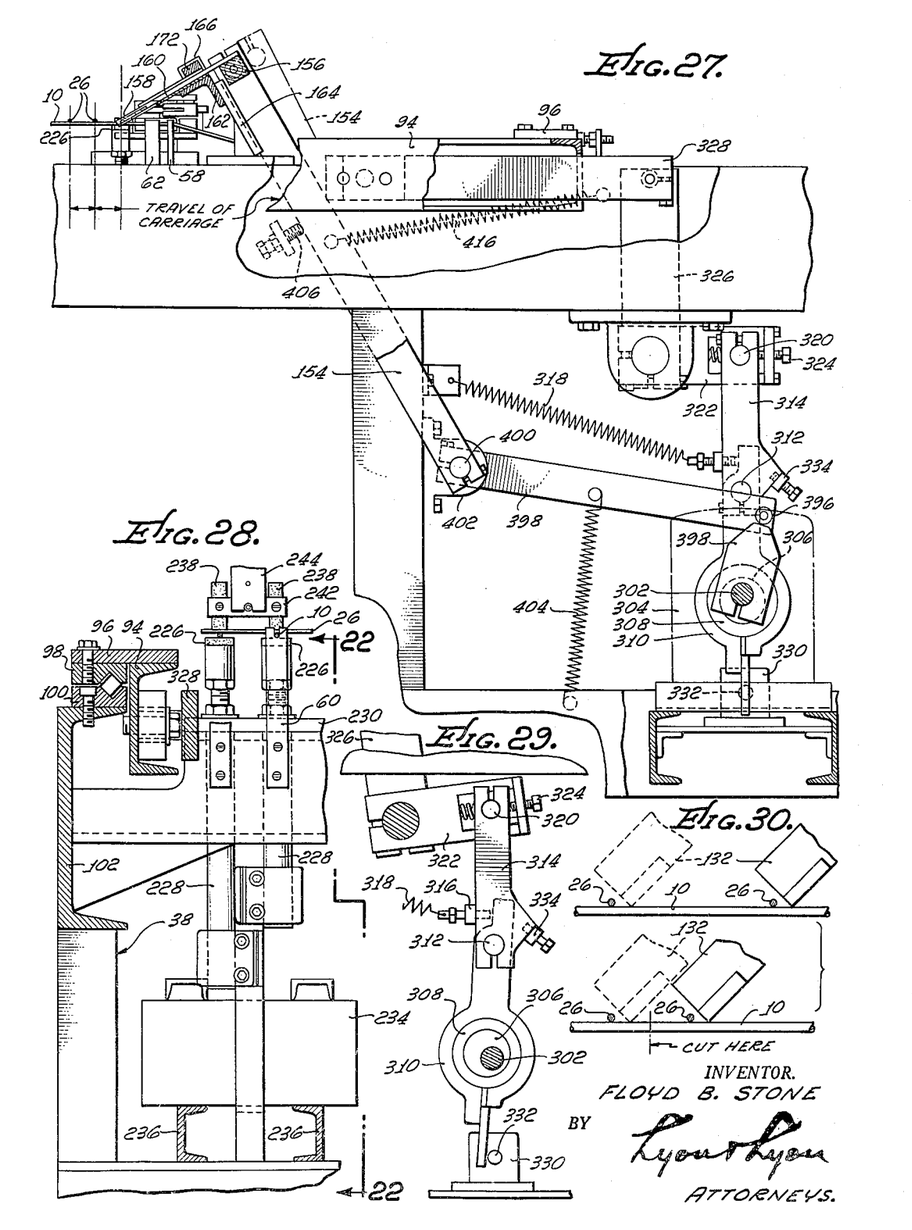
FIGURE 27 is a fragmentary side elevation viewed from the same side of FIGURE 1 with certain parts broken away illustrating the longitudinal wire feeding mechanism.
FIGURE 28 is a fragmentary cross-section illustrating the welding mechanism.
FIGURE 29 is a side elevation of the carriage moving mechanism.
FIGURE 30 is a diagrammatic view of the longitudinal wire gripping mechanism.

The carriage 94 reciprocating means is best illustrated in FIGURES 27 and 29 and is actuated by an eccentric 306 mounted upon drive shaft 302. The eccentric in turn fits within a bearing sleeve 308 upon which eccentric arm 310 is mounted. The upper extremity of eccentric arm 310 has a pin 312 which projects through lever 314 pivotally connecting the arm and lever. The lever 314 carries a stop 316 which engages the extremity of arm 310 when spring 318 straightens out the elbow joint thus formed. Spring 318 is fixed at one extremity to the fixed frame 38 of the machine and to stop 316 at its other end.

The upper extremity of lever 314 receives pin 320 which is adjustable in lever 322. The pin is mounted on screw 324 which screws into an opening in lever 322 thereby varying the effective length of lever 322 and the length of the stroke of the carriage. The lever 322 is pivotally connected to lever 326 which in turn is pivotally connected to arm 328 which in turn is pivotally connected to the frame of carriage 94. Thus the rotary motion of drive shaft 302 through the linkage just described reciprocates the carriage 94, the size of eccentric 306 establishing roughly the length of strokes of the cartridge and the screw 324 permitting fine adjustment of the length of the stroke.

As heretofore described generally upon each stroke of the carriage a cross wire 26 is welded in place. Upon a predetermined number of cross wires 26 being fixed in place, a solenoid 330 is energized, as will hereafter be described, so that its pin 332 moves into the path of the lower extremity of eccentric arm 310 restraining the movement of the upper extremity of said arm and pivoting same on bearing sleeve 308 until a second stop 334 on lever 314 engages the upper extremity of arm 310. Thus an interruption is provided in the transmission of rotary movement of shaft 302 to the carriage during the time eccentric arm 310 pivots between stops 316 and 334, materially reducing the length of stroke of the carriage 94 with the result that a pair of cross wires 26 will be closer to each other than usual as seen in FIGURES 16 and 30 at 336. At this point also there exists a gap between adjacent sheets or backings 18 and it is between this particular pair of cross wires that the cutting mechanism 36 operates to cut off a section of lathing.

The mechanism for pivoting fingers 132 of the longitudinal wire feeding mechanism 32 is likewise actuated by drive shaft 302. A cam 338 is mounted on the drive shaft. A cam follower 340 (see FIGURE 34) is mounted upon one end of rod 342 pivotally connected to support arm 344 in turn pivotally supported from frame 38. The other end of rod 342 is pivotally connected to lever 346 which bears a pin 348 projecting through bearing 350 and to which pin lever 352 is fastened. The lever 352 is pivotally mounted to one end of arm 354 which has its other end pivotally secured to lever 356 which in turn is fixed to the end of stud 130 formed on square shaft 128. Thus the rotation of drive shaft 302 is transmitted through the linkage to counterclockwise rotation of shaft 128 pivoting wire engaging fingers 132 into contact with the longitudinal wires 10. A spring 358 has one end attached to frame 38 and through turnbuckle 360. The other end is attached to bracket 362 on lever 352. When the cam has rotated beyond the point where it exerts a force to the left in FIGURE 34, the spring takes charge, keeping cam follower 340 in contact with cam 338 and pivoting fingers 132 clockwise in FIGURE 34 releasing wires 10 preparatory to the return stroke of carriage 94.

Turnbuckle 364 in arm 354 permits varying its length and hence the amount of pivoting of fingers 132 while turnbuckle 360 permits varying the spring tension. Thus, by appropriately shaping cam 338, as is well known to those skilled in the art, the depression of fingers 132 is coordinated with forward movement thereof with carriage 94.

The mechanism for driving the cross wire feeding wheels 142 and 144 are constantly driven by means actuated by a separate drive shaft 366 from gear reduction box 304 which is driven at a reduced speed with respect to drive shaft 302. Fixed on shaft 366 (see FIGURE 6) is a pulley 368 over which belt 370 is reeved. The belt passes over a second pulley 371 supported on bracket 372 fixed on frame 38. In order to adjust the tension in belt 370 and thereby the speed of rotation of pulley 371, a lever 374 is pivotally mounted on frame 38 and carries an idler wheel 376 for engagement with belt 370. The upper extremity of lever 374 is pivotally attached to bolt 378 in turn supported by frame 38. By adjustment of bolt 378 the slack in belt 370 is adjusted, controlling the speed of rotation of pulley 371 and hence shaft 380 upon which the pulley is mounted. The shaft 380 through finger clutch 382 (see FIGURE 5) drives a bevel gear 384 which meshes with and drives bevel gear 386 mounted upon vertical shaft 387 the upper extremity of which wheel 144 is mounted. At the lower extremity shaft 386 carries a spur gear 388 which meshes with and drives spur gear 390 mounted upon shaft 392 which at its opposite end carries wheel 142.

The two wheels thus frictionally engage wire 146 from its spool and feeds same transversely into the machine with the speed adjusted by bolts 378. After knife 200 severs the wire, it temporarily blocks the wire feeding through sleeve 150 during retraction of slide 182 and this delay, plus the time consumed in the wires reaching the grooves 176 and 178 of the cross wire feeding mechanism, permits the welding of the preceding cross wire 26 and advancement of carriage 94 to advance the lathing to the position wherein the next cross wire is to be affixed.

The mechanism for pivoting arm 154 which moves fingers 158 to move the cross wires 26 into the welding unit is likewise driven by shaft 302. A cam 394 (see FIGURE 1) is mounted upon the drive shaft 302 while cam follower 396 is carried on arm 398. The opposite end of arm 398 is rigidly fixed to pin 400 which is rotatably mounted in bearing 402 supported on frame 38. Spring 404 biases arm 398 keeping the cam follower 396 is contact with cam 394 having one extremity connected to arm 398 and the other to frame 38 of the machine. Arm 154 has its lower end rigidly secured to pin 400 so that pivoting of arm 398 by the cam 394 is translated into pivoting of arms 154. A pair of adjustable stops 406 and 408 are fixed on the frame 38 of the machine on either side of arms 154 engagement of which limits pivoting of arm 154. By screwing the stops in their supports the pivoting of arms 154 may be controlled. An additional spring 410 is fixed at one end to arms 154 and the other to the frame 38 to assist spring 404 and provide additional support for arms 154.

Figures 31, 32, 33:
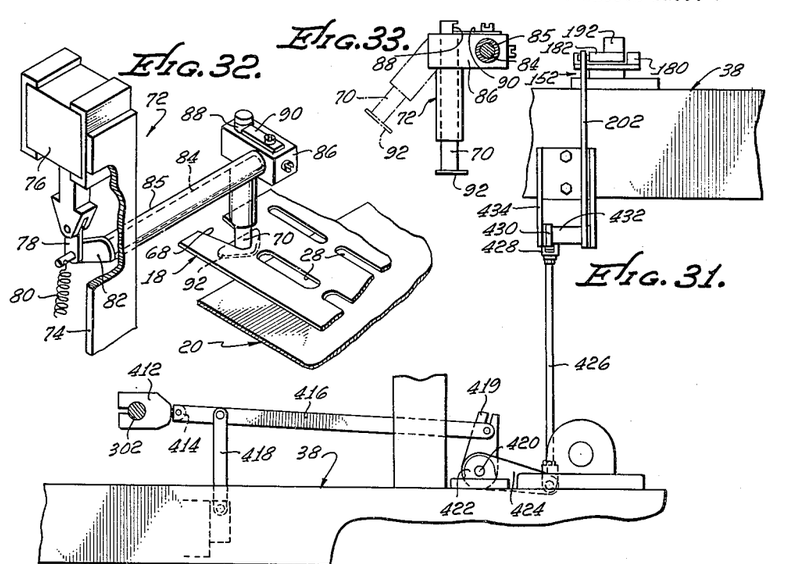
FIGURE 31 is a fragmentary side elevation of the wire cutting operating means.
FIGURE 32 is a diagrammatic perspective of the paper holding means.
FIGURE 33 is a diagrammatic view illustrating pivoting of the paper holding means.
Figures 34, 35:
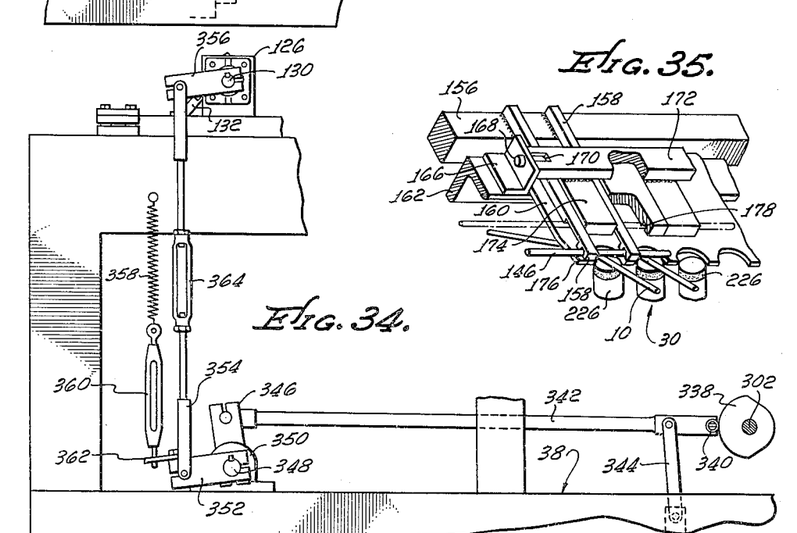
FIGURE 34 is a side elevation of the longitudinal wire moving drive means.
FIGURE 35 is a fragmentary perspective of the cross wire feeding and holding means.

The mechanism for reciprocating slide 182 is best seen in FIGURES 5 and 31. A cam 412 is rigidly mounted on shaft 302 while cam follower 414 is mounted on an end of arm 416. The arm 416 is pivotally secured to support arm 418 in turn pivotally mounted upon the frame 38 of the machine. The other end of arm 416 is pivotally secured to crank 419 which is rigidly secured to pin 420 rotatably mounted in bearing 422. On the opposite side of bearing 422 a second crank 424 is rigidly fixed on pin 420 and pivotally connected to arm 426. The arm 426 has a clevis 428 which receives bell crank 430 which is pivotally mounted therein. The bell crank is fixed on shaft 432 rotatably supported in clevis 434. Rigidly fixed upon shaft 432 is rod 202 so that the cam 412 through the linkage just described causes rod 202 to reciprocate transversely of bed 16 reciprocating slide 182, as previously described.

A similar mechanism is utilized to raise and lower the cross bar 240 and hence the upper electrodes 238. The bar 240 has depending therefrom an arm 436 which is pivotally connected to arm 438 at hinge point 440. The arm 438 is reciprocated through an identical linkage to that which reciprocates arm 426.

The cutting knife 288 reciprocating mechanism is driven in the same manner off of a cam on the drive shaft 302. Through a substantially identical linkage as that described for operating the reciprocation of arm 426 the rod 442 (see FIGURE 5), is reciprocated. Rod 442 is pivotally connected by hinge 444 to arm 446 which in turn is fixed to cross bar 290. In this manner rotation of drive shaft 302 raises and lowers the knife 288 with the timing thereof controlled by the contour of a cam on the drive shaft 302.

Since it is desirable to cut the sections of lathing off after a predetermined number of cross wires 26 have been welded into place, the rod 448 (see FIGURES 1 and 5), is supported upon a solenoid arm 450 of solenoid 452 and carries a lug 454 adapted to engage pin 456 mounted upon lever 458. Normally the solenoid arm is lowered so that lug 454 does not engage the pin upon movement of rod 448. At the appropriate time the solenoid is energized raising rod 448 so that lug 454 engages pin 456 actuating the mechanism for lowering the cutting knife 288.

The actuation of solenoid 452 is accomplished by closing switch 459 (FIGURE 1). This switch is closed by a switch trip 460 carried upon endless chain 462. The chain is trained over sprockets 464 and 466 suitably mounted on the frame 38 of the machine. Sprocket 466 is secured upon another gear 468 which meshes with gear 470 mounted upon and driven by drive shaft 302.

Figure 4:
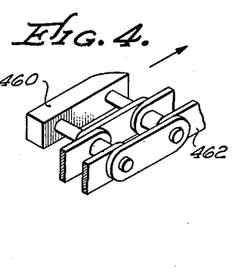
FIGURE 4 is a perspective view of the switch trip.

After the switch trip passes switch 459, resulting in cutting a section of lathing off, it proceeds clockwise, as in FIGURE 4, and next closes switch 472 which completes the circuit to solenoid 76 pivoting arm 70 to the upper position releasing a new sheet of backing or paper 18. At the same time switch 474 is closed by cam 476 mounted upon drive shaft 302 which closes the circuits to magnets 108 and 118 of the paper advancing mechanism for the desired length of time to feed the next sheet 18 into the machine. After switch trip 460 has passed switch 472 arm 70 returns to its normal position arresting the next sheet 18, also cam 476 permits switch 474 to open.

A second cam 478 mounted upon drive shaft 302 then closes switch 480 which completes the circuit of the welding unit permitting the welding current to flow, after which the cam passes the switch breaking the circuit.

A third cam 482 on drive shaft 302 closes switch 484 thereby completing the circuit which results in the compressed air flow through line 486 to raise piston rod 276 and actuate the crimping mechanism. Upon opening of switch 484 air is admitted through line 488 and exhausted through line 486 to lower rod 276.

After the switch trip has passed switch 472 it progresses around to where it engages the switch 490 closing same and energizing solenoid 330 which projects arm 332 into the path of eccentric arm 310 breaking the elbow connection with lever 314 resulting in two cross wires 26 being welded onto the longitudinal wires 10 in the close relationship designated 336 in FIGURE 16.

It is apparent that the speed of travel of chain 462 can be varied by the ratio of the gears 466, 468 and 470. The speed of travel of the switch trip 460 controls the number of cross wires 26 welded onto the longitudinal wires prior to severing of a section of lathing. By proper positioning of switches 472 and 490 the releasing of a new sheet 18 and the formation of the portion of the lathing to be cut can be properly timed. Similarly formation and positioning of cams 476, 478 and 482 times the functioning of the paper feeding, welding and crimping operations.

In operation the longitudinal wires 10 are drawn into the machine by fingers 132 clamping same to anvil 140 during forward movement of carriage 94. Simultaneously the backing 18 is fed into the machine by magnets 108 being energized and moving with the carriage. During each forward movement of carriage 94 the wire 146 is being fed through the cross wire feeding mechanism 32 by wheels 142 and 144 and is cut off by knife 200 forming a cross wire 26. This cross wire is fed by fingers 158 upon pivoting of arms 154 to a position above lower electrodes 226 and engaging the longitudinal wires 10 through the apertures in sheet 18. At this time the upper electrodes are lowered under the cam actuated linkage pulling arm 436 down. Cam 478 closes switch 480 completing the welding circuit. The upper electrodes then rise, arm 154 pivots back and carriage 94 moves to its rearmost position preparatory to its next forward movement drawing the longitudinal wires 10 and backing 18 into the machine.

As the carriage 94 is advanced to repeat the cycle above described, the already welded cross wires 26 advance over bed 16. The crimping mechanism 34 is lowered to push predetermined longitudinal wires out of the plane of the remaining wires upon cam 482 closing switch 484 actuating the compressed air source. After crimping, the section continues along bed 16 under the cutting mechanism 36. After a predetermined number of cross wires 26 have been fixed in position, the solenoid 330 is energized by closing switch 490 tripping eccentric arm 310 and causing a pair of adjacent cross wires to be welded close to one another. The lathing continues to advance through the cutting mechanism until these abnormally close wires are beneath the cutting knife 288 at which time switch 459 is closed energizing solenoid 452 completing the linkage to lower the cutting knife and sever off a section of lathing between the abnormally close wires.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:

1. A machine for forming lathing of the class described comprising: a forming bed, a carriage reciprocating beneath said bed, longitudinal wire guides through which a plurality of spaced longitudinal wires are led to said bed, longitudinal wire feeding means carried by said carriage which, upon movement in one direction, draw said longitudinal wires onto said bed, backing feeding means feeding an apertured backing over said longitudinal wires, transverse wire feeding means periodically feeding a transverse wire across said bed over the apertures in said backing and means for welding said transverse wires to said longitudinal wires through the apertures in said backing.

2. A machine for forming lathing of the class described comprising: a forming bed, a carriage reciprocating beneath said bed, longitudinal wire guides through which a plurality of spaced longitudinal wires are fed to said bed, said guides directing said wires upon a path inclined with respect to said bed, longitudinal wire feeding means on said carriage which, upon movement of said carriage in one direction, draw said longitudinal wires onto said bed, backing feeding means feeding an apertured backing over said longitudinal wires, transverse wire feeding means periodically feeding a transverse wire across said bed over the apertures in said backing and means for welding said transverse wires to said longitudinal wires through the apertures in said backing.

3. A machine for forming lathing of the class described comprising: a forming bed, a carriage reciprocating beneath said bed, longitudinal wire guides through which a plurality of spaced longitudinal wires are led to said bed, longitudinal wire feeding means carried by said carriage which, upon movement in one direction, draw said longitudinal wires onto said bed, means for feeding a backing having a plurality of apertures therein onto said bed, said backing feeding means reciprocating with said carriage and feeding said backing in the same direction as said longitudinal wires are fed, means for periodically feeding transverse wires across said backing and said longitudinal wires, a welding means synchronized with said backing feeding means and transverse wire feeding means for welding said transverse wires to said longitudinal wires through the apertures in said backing.

4. A machine for forming lathing of the class described comprising: a forming bed, a carriage reciprocating beneath said bed, longitudinal wire guides through which a plurality of spaced longitudinal wires are fed to said bed, said guides directing said wires upon a path inclined with respect to said bed, longitudinal wire feeding means including a wire engaging finger for each longitudinal wire mounted upon said carriage, means for engaging said fingers with said wires prior to movement of said carriage in one direction and disengaging said fingers from said wires at the termination of movement of said carriage in said last mentioned direction, backing feeding means feeding an apertured backing over said longitudinal wires, transverse wire feeding means periodically feeding a transverse wire across said bed over the apertures in said backing and means for welding said transverse wires to said longitudinal wires through the apertures in said backing.

5. A machine for forming lathing of the class described, comprising: a forming bed, a carriage reciprocating beneath said bed, means for feeding a plurality of spaced longitudinal wires over said bed, backing feeding means upon said carriage, means operating said backing feeding means to feed a backing having a plurality of apertures therein on said longitudinal wires upon movement of said carriage in one direction only, means for periodically feeding transverse wires across said backing and said longitudinal wires, a welding means synchronized with said backing feeding means and transverse wire feeding means for welding said transverse wires to said longitudinal wires through the apertures in said backing.

6. A machine for forming lathing of the class described comprising: a forming bed, a carriage reciprocating beneath said forming bed, a supporting bed for backing adjacent one extremity of movement of said carriage, said backing having a plurality of apertures therein, longitudinal wire feeding means drawing a plurality of longitudinal wires from beneath said backing supporting bed over said forming bed in spaced relationship, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, means for periodically feeding transverse wires across said backing and said longitudinal wires, a welding means synchronized with said backing feeding means and transverse wire feeding means for welding said transverse wires to said longitudinal wires through the apertures in said backing.

7. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, means for periodically feeding transverse wires across said backing and said longitudinal wires, a welding means synchronized with said backing feeding means and transverse wire feeding means for welding said transverse wires to said longitudinal wires through the apertures in said backing.

8. A machine for forming lathing of the class described comprising: a forming bed, a carriage reciprocating beneath said forming bed, a supporting bed for backing adjacent one extremity of movement of said carriage, said backing having a plurality of apertures therein, longitudinal wire feeding means drawing a plurality of longitudinal wires from beneath said backing supporting bed over said forming bed in spaced relationship, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, transverse wire feeding means periodically feeding a transverse wire across said bed over the apertures in said backing, a plurality of electrodes beneath said bed adjacent the transverse wire feeding means, a plurality of electrodes positioned above said bed and means for lowering said upper electrodes toward said lower electrodes whereby a welding circuit is completed between a pair of electrodes through each longitudinal and transverse wire.

9. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, transverse wire feeding means periodically feeding a transverse wire across said bed over the apertures in said backing, a plurality of electrodes beneath said bed adjacent the transverse wire feeding means, a plurality of electrodes positioned above said bed and means for lowering said upper electrodes toward said lower electrodes whereby a welding circuit is completed between a pair of electrodes through each longitudinal and transverse wire.

10. A machine for forming lathing of the class described comprising: a forming bed, means for feeding a plurality of longitudinal wires over said bed, means feeding an apertured backing onto said bed over said longitudinal wires, a pair of driven wheels engaging a transverse wire and feeding same transversely across said bed over the apertures in said backing and means for welding said transverse wire to said longitudinal wires through the apertures in said backing.

11. A machine for forming lathing of the class described comprising: a forming bed, means for feeding a plurality of longitudinal wires over said bed, means feeding an apertured backing onto said bed over said longitudinal wires, a pair of driven wheels frictionally engaging a transverse wire and feeding same transversely across said bed over the apertures in said backing, cutting means cutting said transverse wire at a predetermined length and means for welding said cut section of transverse wire to said longitudinal wires through the apertures in said backing.

12. A machine for forming lathing of the class described comprising: a forming bed, means for feeding a plurality of longitudinal wires over said bed, means feeding an apertured backing onto said bed over said longitudinal wires, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length and means for welding said section of wire to said longitudinal wires through the apertures in said backing.

13. A machine for forming lathing of the class described comprising: a forming bed, a carriage reciprocating beneath said forming bed, a supporting bed for backing adjacent one extremity of movement of said carriage, said backing having a plurality of apertures therein, longitudinal wire feeding means drawing a plurality of longitudinal wires from beneath said backing supporting bed over said forming bed in spaced relationship, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length and means for welding said section of wire to said longitudinal wires through the apertures in said backing.

14. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length and means for welding said section of wire to said longitudinal wires through the apertures in said backing.

15. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length, a plurality of electrodes beneath said bed adjacent the transverse wire feeding means, a plurality of electrodes positioned above said bed and means for lowering said upper electrodes toward said lower electrodes whereby a welding circuit is completed between a pair of electrodes through each longitudinal and transverse wire.

16. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length, a plurality of electrodes beneath said bed adjacent the transverse wire feeding means, a plurality of electrodes positioned above said bed, means for lowering said upper electrodes toward said lower electrodes whereby a welding circuit is completed between a pair of electrodes through each longitudinal and transverse wire, at least one crimping bar positioned above said forming bed and means for reciprocating said crimping bar to engage successive intersections of a longitudinal wire and transverse wires to move one of said longitudinal wires out of the plane of the lathing.

17. A machine for forming lathing of the class described comprising: a forming bed, means for feeding a plurality of spaced longitudinal wires over said bed, backing feeding means feeding an apertured backing over said longitudinal wires, transverse wire feeding means periodically feeding a transverse wire across said bed over the apertures in said backing, means for welding said transverse wires to said longitudinal wires through the apertures in said backing, a cutting knife at the discharge extremity of said forming bed, means for periodically lowering said cutting knife to sever said longitudinal wires between a pair of adjacent transverse wires cutting off a section of lathing and means for causing said above mentioned pair of transverse wires to be fixed upon said longitudinal wires in abnormally close relationship.

18. A machine for forming lathing of the class described comprising: a forming bed, a carriage reciprocating beneath said forming bed, a supporting bed for backing adjacent one extremity of movement of said carriage, said backing having a plurality of apertures therein, longitudinal wire feeding means drawing a plurality of longitudinal wires from beneath said backing supporting bed over said forming bed in spaced relationship, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length, means for welding said section of wire to said longitudinal wires through the apertures in said backing, a cutting knife at the discharge extremity of said forming bed and means for periodically lowering said cutting knife to sever said longitudinal wires between a pair of adjacent transverse wires cutting off a section of lathing.

19. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping mens to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length, means for welding said section of wire to said longitudinal wires through the apertures in said backing, a cutting knife at the discharge extremity of said forming bed and means for periodically lowering said cutting knife to severe said longitudinal wires between a pair of adjacent transverse wires cutting off a section of lathing.

20. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length, a plurality of electrodes beneath said bed adjacent the transverse wire feeding means, a plurality of electrodes positioned above said bed, means for lowering said upper electrodes toward said lower electrodes whereby a welding circuit is completed between a pair of electrodes through each longitudinal and transverse wire, a cutting knife at the discharge extremity of said forming bed and means for periodically lowering said cutting knife to sever said longitudinal wires between a pair of adjacent transverse wires cutting off a section of lathing.

21. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire leading means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length, a plurality of electrodes beneath said bed adjacent the transverse wire feeding means, a plurality of electrodes positioned above said bed, means for lowering said upper electrodes toward said lower electrodes whereby a welding circuit is completed between a pair of electrodes through each longitudindal and transverse wire, at least one crimping bar positioned above said forming bed, means for reciprocating said crimping bar to engage successive intersections of a longitudinal wire and transverse wires to move one of said longitudinal wires out of the plane of the lathing, a cutting knife at the discharge extremity of said forming bed and means for periodically lowering said cutting knife to sever said longitudinal wires between a pair of adjacent transverse wires cutting off a section of lathing.

22. A machine for forming lathing of the class described comprising: a forming bed, a carriage reciprocating beneath said forming bed, a supporting bed for backing adjacent one extremity of movement of said carriage, said backing having a plurality of apertures therein, longitudinal wire feeding means drawing a plurality of longitudinal wires from beneath said backing supporting bed over said forming bed in spaced relationship, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predeterminmed point in the path of movement of said slide to sever a section of said transverse wire at a predetermined length, means for welding said section of wire to said longitudinal wires through the apertures in said backing, a cutting knife at the discharge extremity of said forming bed, means for periodically lowering said cutting knife to sever said longitudinal wires between a pair of adjacent transverse wires cutting off a section of lathing and means for causing said above mentioned pair of transverse wires to be fixed upon said longitudinal wires in abnormally close relationship.

23. A machine for forming lathing comprising: a forming bed, a carriage reciprocating beneath said forming bed, a supporting bed for backing adjacent one extremity of movement of said carriage, said backing having a plurality of apertures therein, longitudinal wire guides through which a plurality of spaced longitudinal wires are drawn onto said forming bed, longitudinal wire feeding means mounted upon said carriage having a finger engageable with each longitudinal wire, means for engaging said fingers with said longitudinal wires prior to movement of said carriage away from said supporting bed and disengaging said fingers from said longitudinal wires at the termination of movement of said carriage in said last mentioned direction, backing grasping means on said carriage, means actuating said grasping means to grasp a backing on said supporting bed when said carriage has moved to a position nearest said supporting bed and hold same until said carriage has reached a position furthest from said supporting bed drawing said backing over said longitudinal wires onto said forming bed, a pair of driven wheels frictionally engaging a transverse wire and feeding same transversely across said bed over the apertures in said backing, means for cutting said transverse wire at a predetermined length including a reciprocating slide and a knife pivotally mounted upon said slide, means for pivoting said knife at a predetermined point in the path of movement of said slide to sever a section of said transverse wire at a predetermined length, a plurality of electrodes beneath said bed adjacent the transverse wire feeding means, a plurality of electrodes positioned above said bed, means for lowering said upper electrodes toward said lower electrodes whereby a welding circuit is completed between a pair of electrodes through each longitudinal and transverse wire, at least one crimping bar positioned above said forming bed, means for reciprocating said crimping bar to engage successive intersections of a longitudinal wire and transverse wires to move one of said longitudinal wires out of the plane of the lathing, a cutting knife at the discharge extremity of said forming bed, means for periodically lowering said cutting knife to sever said longitudinal wires between a pair of adjacent transverse wires cutting off a section of lathing and means for causing said above-mentioned pair of transverse wires to be fixed upon said longitudinal wires in abnormally close relationship.

References Cited in the file of this patent

UNITED STATES PATENTS

| | | |
|---|---|---|
| 814,393 | Perry | Mar. 6, 1906 |
| 1,343,648 | Smith | June 15, 1920 |
| 1,351,350 | Southwick | Aug. 31, 1920 |
| 1,690,100 | Bull | Nov. 6, 1928 |
| 1,915,184 | Cosgrove | June 20, 1933 |
| 1,923,369 | Gronemeyer et al. | Aug. 22, 1933 |
| 2,390,174 | Roemer | Dec. 4, 1945 |
| 2,487,392 | Southwick | Nov. 8, 1949 |
| 2,636,423 | Cunningham | Apr. 28, 1953 |